US012573187B2

(12) United States Patent
Mondello et al.

(10) Patent No.: US 12,573,187 B2
(45) Date of Patent: Mar. 10, 2026

(54) SELF-LEARNING IN DISTRIBUTED ARCHITECTURE FOR ENHANCING ARTIFICIAL NEURAL NETWORK

(71) Applicant: Lodestar Licensing Group LLC, Evanston, IL (US)

(72) Inventors: Antonino Mondello, Messina (IT); Alberto Troia, Munich (DE)

( * ) Notice: Subject to any disclaimer, the term of this patent is extended or adjusted under 35 U.S.C. 154(b) by 1003 days.

(21) Appl. No.: 17/718,701

(22) Filed: Apr. 12, 2022

(65) Prior Publication Data

US 2022/0237469 A1 Jul. 28, 2022

Related U.S. Application Data

(63) Continuation of application No. 15/858,505, filed on Dec. 29, 2017, now Pat. No. 11,328,210.

(51) Int. Cl.
*B60W 30/00* (2006.01)
*G05D 1/00* (2024.01)
(Continued)

(52) U.S. Cl.
CPC ............. *G06V 10/82* (2022.01); *B60W 30/00* (2013.01); *G05D 1/0088* (2013.01);
(Continued)

(58) Field of Classification Search
CPC .... G06V 10/82; G06V 20/58; G06V 10/7788; G06V 10/764; G06N 3/045; G06N 3/088;
(Continued)

(56) References Cited

U.S. PATENT DOCUMENTS 6,292,719 B1 9/2001 Seto et al.
7,516,041 B2 4/2009 Smartt et al.
(Continued)

FOREIGN PATENT DOCUMENTS

CN 107368076 11/2017
JP 2002293271 A 10/2002
(Continued)

OTHER PUBLICATIONS

Castellano, Giovanna, and Anna Maria Fanelli. "Variable selection using neural-network models." Neurocomputing 31, No. 1-4 (2000): 1-13. (Year: 2000).*

(Continued)

*Primary Examiner* — Casey R. Garner

(57) ABSTRACT

A vehicle having the first ANN model initially installed therein to generate outputs from inputs generated by one or more sensors of the vehicle. The vehicle selects an input based on an output generated from the input using the first ANN model. The vehicle has a module to incrementally train the first ANN model through unsupervised machine learning from sensor data that includes the input selected by the vehicle. Optionally, the sensor data used for the unsupervised learning may further include inputs selected by other vehicles in a population. Sensor inputs selected by vehicles are transmitted to a centralized computer server, which trains the first ANN model through supervised machine learning from sensor received inputs from the vehicles in the population and generates a second ANN model as replacement of the first ANN model previously incrementally improved via unsupervised machine learning in the population.

20 Claims, 6 Drawing Sheets

(51) Int. Cl.

| | |
|---|---|
| *G06N 3/045* | (2023.01) |
| *G06N 3/088* | (2023.01) |
| *G06V 10/764* | (2022.01) |
| *G06V 10/778* | (2022.01) |
| *G06V 10/82* | (2022.01) |
| *G06V 20/58* | (2022.01) |

(52) U.S. Cl.

CPC ......... *G05D 1/0221* (2013.01); *G05D 1/0223* (2013.01); *G05D 1/0287* (2013.01); *G06N 3/045* (2023.01); *G06N 3/088* (2013.01); *G06V 10/764* (2022.01); *G06V 10/7788* (2022.01); *G06V 20/58* (2022.01); *G05D 1/024* (2013.01); *G05D 1/0242* (2013.01); *G05D 1/0246* (2013.01); *G05D 1/0255* (2013.01); *G05D 1/0257* (2013.01)

(58) Field of Classification Search

CPC ... B60W 30/00; G05D 1/0088; G05D 1/0221; G05D 1/0223; G05D 1/0287; G05D 1/024; G05D 1/0242; G05D 1/0246; G05D 1/0255; G05D 1/0257

See application file for complete search history.

(56) References Cited

U.S. PATENT DOCUMENTS

| | | | |
|---|---|---|---|
| 7,549,021 | B2 | 6/2009 | Warren, Jr. |
| 8,160,764 | B2 | 4/2012 | Choi et al. |
| 8,174,912 | B2 | 5/2012 | Warren |
| 8,520,695 | B1 | 8/2013 | Rubin et al. |
| 9,134,133 | B2 | 9/2015 | Denaro |
| 9,245,188 | B2 | 1/2016 | Han |
| 9,413,779 | B2 | 8/2016 | Vasseur et al. |
| 9,450,978 | B2 | 9/2016 | Vasseur et al. |
| 9,503,466 | B2 | 11/2016 | Vasseur et al. |
| 9,521,158 | B2 | 12/2016 | Di Pietro et al. |
| 9,563,397 | B1 | 2/2017 | Stoev et al. |
| 9,563,854 | B2 | 2/2017 | Cruz Mota et al. |
| 9,656,606 | B1 | 5/2017 | Vose et al. |
| 9,672,734 | B1 | 6/2017 | Ratnasingam |
| 9,733,093 | B2 | 8/2017 | Denaro |
| 9,751,534 | B2 | 9/2017 | Fung et al. |
| 9,752,884 | B2 | 9/2017 | Denaro |
| 9,797,735 | B2 | 10/2017 | Denaro |
| 9,805,601 | B1 | 10/2017 | Fields et al. |
| 9,947,145 | B2 | 4/2018 | Wang et al. |
| 10,001,760 | B1 | 6/2018 | Hoffmann et al. |
| 10,007,269 | B1 | 6/2018 | Gray |
| 10,019,654 | B1 | 7/2018 | Pisoni |
| 10,157,422 | B2 | 12/2018 | Jordan Peters et al. |
| 10,185,999 | B1 | 1/2019 | Konrardy et al. |
| 10,217,028 | B1 | 2/2019 | Wang et al. |
| 10,254,760 | B1 | 4/2019 | Abeloe |
| 10,296,004 | B2 | 5/2019 | Nishi |
| 10,308,181 | B2 | 6/2019 | Nix |
| 10,311,312 | B2 | 6/2019 | Yu et al. |
| 10,366,502 | B1 | 7/2019 | Li |
| 10,386,792 | B2 | 8/2019 | Blayvas |
| 10,423,358 | B1 | 9/2019 | Foo |
| 10,427,655 | B2 | 10/2019 | Nix |
| 10,459,444 | B1 | 10/2019 | Kentley-Klay |
| 10,522,038 | B2 | 12/2019 | Bielby |
| 10,549,781 | B2 | 2/2020 | Park et al. |
| 10,564,853 | B2 | 2/2020 | Linkovsky et al. |
| 10,599,546 | B1 | 3/2020 | Walther et al. |
| 10,611,379 | B2 | 4/2020 | Olabiyi et al. |
| 10,671,572 | B2 | 6/2020 | Auch et al. |
| 10,672,200 | B2 | 6/2020 | Wang et al. |
| 10,678,244 | B2 | 6/2020 | Iandola et al. |
| 10,713,955 | B2 | 7/2020 | Tong et al. |
| 10,733,506 | B1 | 8/2020 | Ogale et al. |
| 10,782,909 | B2 | 9/2020 | Kim et al. |
| 10,846,955 | B2 | 11/2020 | Golov |
| 10,971,013 | B2 | 4/2021 | Bielby |
| 10,994,741 | B2 | 5/2021 | Zhou et al. |
| 11,020,855 | B2 | 6/2021 | Nakayama et al. |
| 11,120,353 | B2 | 9/2021 | Olabiyi et al. |
| 11,188,821 | B1 | 11/2021 | Kalakrishnan et al. |
| 11,328,210 | B2 | 5/2022 | Mondello et al. |
| 11,373,466 | B2 | 6/2022 | Golov |
| 11,410,475 | B2 | 8/2022 | Golov |
| 11,417,109 | B1 | 8/2022 | Theimer et al. |
| 11,427,190 | B2 | 8/2022 | Yang et al. |
| 11,462,100 | B2 | 10/2022 | Kang et al. |
| 11,535,262 | B2 | 12/2022 | Beaurepaire et al. |
| 11,577,719 | B2 | 2/2023 | Tanahashi et al. |
| 11,670,124 | B2 | 6/2023 | Golov |
| 11,705,004 | B2 | 7/2023 | Bielby |
| 2002/0194016 | A1 | 12/2002 | Moribe et al. |
| 2004/0128062 | A1 | 7/2004 | Ogino et al. |
| 2004/0215373 | A1 | 10/2004 | Won et al. |
| 2005/0273218 | A1 | 12/2005 | Breed et al. |
| 2005/0278118 | A1 | 12/2005 | Kim |
| 2007/0296574 | A1 | 12/2007 | Smith et al. |
| 2008/0243380 | A1 | 10/2008 | Han |
| 2009/0105902 | A1 | 4/2009 | Choi et al. |
| 2009/0299630 | A1 | 12/2009 | Denaro |
| 2009/0300035 | A1 | 12/2009 | Denaro |
| 2009/0300053 | A1 | 12/2009 | Denaro |
| 2010/0019891 | A1 | 1/2010 | Mudalige |
| 2010/0241353 | A1 | 9/2010 | Park |
| 2010/0332266 | A1 | 12/2010 | Tamir et al. |
| 2011/0190972 | A1 | 8/2011 | Timmons et al. |
| 2011/0304447 | A1 | 12/2011 | Marumoto |
| 2012/0166229 | A1 | 6/2012 | Collins et al. |
| 2012/0203418 | A1 | 8/2012 | Braennstroem et al. |
| 2012/0323474 | A1 | 12/2012 | Breed et al. |
| 2013/0097369 | A1 | 4/2013 | Talagala et al. |
| 2013/0317665 | A1 | 11/2013 | Fernandes et al. |
| 2013/0325306 | A1 | 12/2013 | Caveney et al. |
| 2013/0346350 | A1 | 12/2013 | Subramanian et al. |
| 2014/0049646 | A1 | 2/2014 | Nix |
| 2014/0081505 | A1 | 3/2014 | Klinger et al. |
| 2014/0201126 | A1 | 7/2014 | Zadeh et al. |
| 2014/0215119 | A1 | 7/2014 | Fujii |
| 2014/0324275 | A1 | 10/2014 | Stanek et al. |
| 2015/0026108 | A1 | 1/2015 | Portegys et al. |
| 2015/0100530 | A1 | 4/2015 | Mnih et al. |
| 2015/0161454 | A1 | 6/2015 | Han |
| 2015/0179066 | A1 | 6/2015 | Rider et al. |
| 2015/0185026 | A1 | 7/2015 | Hightower et al. |
| 2015/0193693 | A1 | 7/2015 | Vasseur et al. |
| 2015/0193694 | A1 | 7/2015 | Vasseur et al. |
| 2015/0193695 | A1 | 7/2015 | Cruz Mota et al. |
| 2015/0193696 | A1 | 7/2015 | Vasseur et al. |
| 2015/0193697 | A1 | 7/2015 | Vasseur et al. |
| 2015/0195145 | A1 | 7/2015 | Di Pietro et al. |
| 2015/0195146 | A1 | 7/2015 | Di Pietro et al. |
| 2015/0254555 | A1 | 9/2015 | Williams, Jr. et al. |
| 2015/0324686 | A1 | 11/2015 | Julian et al. |
| 2015/0324923 | A1 | 11/2015 | Christensen et al. |
| 2016/0020943 | A1 | 1/2016 | Diab et al. |
| 2016/0027305 | A1 | 1/2016 | Inaba et al. |
| 2016/0042642 | A1 | 2/2016 | Yamashiro et al. |
| 2016/0061625 | A1 | 3/2016 | Wang |
| 2016/0078339 | A1 | 3/2016 | Li et al. |
| 2016/0104047 | A1 | 4/2016 | Sibiryakov |
| 2016/0150195 | A1 | 5/2016 | Good et al. |
| 2016/0223343 | A1 | 8/2016 | Averbuch et al. |
| 2016/0363935 | A1 | 12/2016 | Shuster et al. |
| 2017/0008168 | A1 | 1/2017 | Weng et al. |
| 2017/0008521 | A1 | 1/2017 | Braunstein et al. |
| 2017/0024938 | A1 | 1/2017 | Lindsay |
| 2017/0053530 | A1 | 2/2017 | Gogic et al. |
| 2017/0084177 | A1 | 3/2017 | Matsuoka et al. |
| 2017/0101054 | A1 | 4/2017 | Dusane |
| 2017/0101093 | A1 | 4/2017 | Barfield, Jr. et al. |
| 2017/0113664 | A1 | 4/2017 | Nix |
| 2017/0132527 | A1 | 5/2017 | Ahn et al. |
| 2017/0144657 | A1 | 5/2017 | Hassani et al. |
| 2017/0148237 | A1 | 5/2017 | Iwaasa |
| 2017/0162051 | A1 | 6/2017 | Satoh |

(56) References Cited

U.S. PATENT DOCUMENTS

| | | |
|---|---|---|
| 2017/0169208 A1 | 6/2017 | Jantz et al. |
| 2017/0200284 A1 | 7/2017 | Lee et al. |
| 2017/0221362 A1 | 8/2017 | Gunaratne |
| 2017/0242436 A1 | 8/2017 | Creusot |
| 2017/0262735 A1 | 9/2017 | Ros Sanchez et al. |
| 2017/0293808 A1 | 10/2017 | Jain et al. |
| 2017/0305434 A1 | 10/2017 | Ratnasingam |
| 2017/0326726 A1 | 11/2017 | Grotmol et al. |
| 2018/0018775 A1 | 1/2018 | Piekniewski et al. |
| 2018/0025268 A1 | 1/2018 | Teig et al. |
| 2018/0053071 A1 | 2/2018 | Chen et al. |
| 2018/0068206 A1 | 3/2018 | Pollach et al. |
| 2018/0082137 A1 | 3/2018 | Melvin et al. |
| 2018/0157920 A1 | 6/2018 | Hu |
| 2018/0164825 A1 | 6/2018 | Matus et al. |
| 2018/0173971 A1 | 6/2018 | Jia et al. |
| 2018/0174023 A1 | 6/2018 | Imam et al. |
| 2018/0174457 A1 | 6/2018 | Taylor |
| 2018/0188733 A1 | 7/2018 | Iandola et al. |
| 2018/0211524 A1 | 7/2018 | Furuichi et al. |
| 2018/0215344 A1 | 8/2018 | Santora et al. |
| 2018/0257643 A1 | 9/2018 | Kroop et al. |
| 2018/0268266 A1 | 9/2018 | Sohn et al. |
| 2018/0285735 A1 | 10/2018 | Baum et al. |
| 2018/0292825 A1 | 10/2018 | Smolyanskiy et al. |
| 2018/0300964 A1 | 10/2018 | Akshamanan et al. |
| 2018/0328741 A1 | 11/2018 | Pratt et al. |
| 2019/0019082 A1 | 1/2019 | Dasgupta et al. |
| 2019/0034762 A1 | 1/2019 | Hashimoto |
| 2019/0035113 A1 | 1/2019 | Salvi et al. |
| 2019/0035277 A1 | 1/2019 | Son et al. |
| 2019/0047555 A1 | 2/2019 | During et al. |
| 2019/0050624 A1 | 2/2019 | Chai et al. |
| 2019/0072965 A1 | 3/2019 | Zhang et al. |
| 2019/0082185 A1 | 3/2019 | Satavalekar et al. |
| 2019/0088132 A1 | 3/2019 | Riggins et al. |
| 2019/0098471 A1 | 3/2019 | Rech et al. |
| 2019/0108651 A1 | 4/2019 | Gu et al. |
| 2019/0113927 A1 | 4/2019 | Englard et al. |
| 2019/0122109 A1 | 4/2019 | Busch et al. |
| 2019/0122543 A1 | 4/2019 | Matus et al. |
| 2019/0138889 A1 | 5/2019 | Jiang et al. |
| 2019/0146930 A1 | 5/2019 | Verhaeghe et al. |
| 2019/0147254 A1 | 5/2019 | Bai et al. |
| 2019/0147331 A1 | 5/2019 | Arditi |
| 2019/0164430 A1 | 5/2019 | Nix |
| 2019/0187706 A1 | 6/2019 | Zhou et al. |
| 2019/0187707 A1 | 6/2019 | Zheng et al. |
| 2019/0189007 A1 | 6/2019 | Herman et al. |
| 2019/0204088 A1 | 7/2019 | Haque et al. |
| 2019/0205744 A1 | 7/2019 | Mondello et al. |
| 2019/0205765 A1 | 7/2019 | Mondello et al. |
| 2019/0206255 A1 | 7/2019 | Tao et al. |
| 2019/0221125 A1 | 7/2019 | Kato et al. |
| 2019/0251396 A1 | 8/2019 | Geraci et al. |
| 2019/0256064 A1 | 8/2019 | Hecker et al. |
| 2019/0258251 A1 | 8/2019 | Ditty et al. |
| 2019/0268726 A1 | 8/2019 | Jiang et al. |
| 2019/0272433 A1 | 9/2019 | Yu et al. |
| 2019/0279028 A1 | 9/2019 | Wang et al. |
| 2019/0302766 A1 | 10/2019 | Mondello et al. |
| 2019/0325750 A1 | 10/2019 | Bielby |
| 2019/0355256 A1 | 11/2019 | Bielby |
| 2020/0019794 A1 | 1/2020 | Engelcke et al. |
| 2020/0026283 A1 | 1/2020 | Barnes et al. |
| 2020/0068250 A1 | 2/2020 | Bhooi et al. |
| 2020/0089580 A1 | 3/2020 | Paley et al. |
| 2020/0101917 A1 | 4/2020 | Kumar et al. |
| 2020/0118436 A1 | 4/2020 | Gogic et al. |
| 2020/0130685 A1 | 4/2020 | Nguyen et al. |
| 2020/0175787 A1 | 6/2020 | Gortsas |
| 2020/0209810 A1 | 7/2020 | Bazhenov et al. |
| 2020/0210336 A1 | 7/2020 | Brautigam et al. |
| 2020/0249683 A1 | 8/2020 | Rosales et al. |
| 2020/0250901 A1 | 8/2020 | Golov |
| 2020/0250902 A1 | 8/2020 | Golov |
| 2020/0257301 A1 | 8/2020 | Weiser et al. |
| 2020/0279129 A1 | 9/2020 | Batchelor et al. |
| 2020/0401136 A1 | 12/2020 | Iandola et al. |
| 2020/0411737 A1 | 12/2020 | Barnes et al. |
| 2021/0241622 A1 | 8/2021 | Bielby |
| 2022/0254202 A1 | 8/2022 | Golov |
| 2022/0264270 A1 | 8/2022 | Monteuuis et al. |
| 2022/0319253 A1 | 10/2022 | Golov |
| 2023/0351893 A1 | 11/2023 | Bielby |
| 2023/0386276 A1 | 11/2023 | Golov |

FOREIGN PATENT DOCUMENTS

| | | |
|---|---|---|
| JP | 2009076050 | 4/2009 |
| KR | 20100057253 A | 5/2010 |
| WO | 2008007878 A1 | 1/2018 |
| WO | 2019016114 A1 | 1/2019 |
| WO | 2019092439 | 5/2019 |

OTHER PUBLICATIONS

Ana Gainaru, et al., "Fault prediction under the microscope: A closer look into HPC systems." Proceedings of the International Conference on High Performance Computing, Networking, Storage and Analysis, IEEE, 2012.

Lev Mukhanov, et al., "Workload-Aware DRAM Error Prediction using Machine Learning." IEEE International Symposium on Workload Characterization (IISWC), IEEE, 2019.

Xiaoming Du, et al., "Predicting Uncorrectable Memory Errors for Proactive Replacement: An Empirical Study on Large-Scale Field Data." 16th European Dependable Computing Conference (EDCC), 2020.

Barnes, et al. "Driven to Distraction: Self-Supervised Distractor Learning for Robust Monocular Visual Odometry in Urban Environments." arXiv: 1711.06623v1, Nov. 17, 2017.

Barnes, et al. "Find Your Own Way: Weakly-Supervised Segmentation of Path Proposals for Urban Autonomy." arXiv:1610.01238v3, Nov. 17, 2017.

Kahn, et al. "Self-supervised Deep Reinforcement Learning with Generalized Computation Graphs for Robot Navigation." arXiv:1709.10489v2, Nov. 30, 2017.

Pan, et al. "Spatial As Deep: Spatial CNN for Traffic Scene Understanding." arXiv:1712.06080v1, Dec. 17, 2017.

Richter, et al. "Safe Visual navigation via Deep learning and Novelty Detection." Robotics: Science and Systems XIII, Jul. 12, 2017.

Wang, et al. "Understanding Convolution for Semantic Segmentation." arXIV:1702.08502v2, Nov. 9, 2017.

Wikipedia. "Self-supervised learning." Retrieved from the Internet <https://en.wikipedia.org/wiki/Self-supervised_learning> on May 31, 2022.

Ashok, Ashwin, et al., "Enabling Vehicular Applications using Cloud Services through Adaptive Computation Offloading." ACM, Sep. 11, 2015.

Kazuki, Ueda, et al., "Parallel Implementation of Real-Time Communication and IP Communication by using Multiple Ring Buffers." IEEE, 2014.

Liebig, Thomas, et al., "Distributed Traffic Flow Prediction with Label Proprotions: From in-Network towards High Performance Computation with MPI." Proceedings of the 2nd International Workshop on Mining Urban Data, 2015.

Aljosa Osep, et al. "Large-Scale Object Discovery and Detector Adaptation from Unlabeled Video." arXiv:1712.08832v1, Dec. 23, 2017.

Atoum, et al. "Monocular Video-Based Trailer Coupler Detection Using Multiplexer Convolutional Neural Network." EEE International Conference on Computer Vision, Oct. 2017.

Bin Yang, Ming Liang, Raquel Urtasun, "HDNET: Exploiting HD Maps for 3D Object Detection", Proceedings of The 2nd Conference on Robot Learning, PMLR 87:146-155, 2018.

Bojarski et al., "End to End Learning for Self-Driving Cars." arXiv:1604.07316v1, Apr. 25, 2016.

(56) References Cited

OTHER PUBLICATIONS

Chelsea Finn, et al. "Generalizing Skills with Semi-Supervised Reinforcement Learning." Conference paper at ICLR, 2017.

Chen, et al. "Brain-Inspired Cognitive Model with Attention for Self-Driving Cars." Feb. 19, 2017.

David Stavens, et al. "A Self-Supervised Terrain Roughness Estimator for Off-Road Autonomous Driving." arXiv:1206.6872, Jun. 27, 2012.

Eraqi, et al. "End-toEnd Deep Learning for Steering Autonomous Vehicles Considering Temporal Dependencies." 31st Conference on Neural Information Processing Systems, Nov. 22, 2017.

Evan Shelhamer, et al. "Loss is its own Reward: Self-Supervision for Reinforcement Learning." arXiv:1612.07307, Mar. 9, 2017.

Fridman et al., "MIT Autonomous Vehicle Technology Study: Large-Scale Deep Learning Based Analysis of Driver Behavior and Interaction with Automation." arXiv:1711.06976v1, Nov. 19, 2017.

Guy Rosman, et al. "Hybrid Control and Learning with Coresets for Autonomous Vehicles." IEEE/RSJ International Conference on Intelligent Robots and Systems (IROS), IEEE, Sep. 24-28, 2017.

Harsha Vardhan, "HD Maps: New age maps powering autonomous vehicles", https://www.geospatialworld.net/article/hd-maps-autonomous-vehicles/, Sep. 22, 2017.

Hou, et al. "Fast Recurrent Fully Convolutional networks for Direct Perception in Autonomous Driving." Nov. 20, 2017.

International Search Report and Written Opinion, PCT/US2018/063669, mailed Mar. 25, 2019.

International Search Report and Written Opinion, PCT/US2020/015877, mailed May 27, 2020.

Jin et al., "How to scale distributed deep learning?" arXiv1611.04581v1, Nov. 14, 2016.

Junhong Xu, et al. "Avoidance of Manual Labeling in Robotic Autonomous Navigation Through Multi-Sensory Semi-Supervised Learning." arXiv:1709.07911v3, Oct. 9, 2017.

Liu, et al. "A Unified Cloud Platform for Autonomous Driving." IEEE Computer Society, Dec. 18, 2017.

Miguel A. Bautista, et al. "Learning Where to Drive by Watching Others." German Conference on Pattern Recognition, Aug. 15, 2017.

Mohammed Abdulla Yousuf, et al. U.S. "Systems and Methods for Safe and Reliable Autonomous Vehicles." U.S. Appl. No. 62/584,549, filed Nov. 10, 2017.

Olabiyi et al., "Driver Action Prediction Using Deep (Bidirectional) Recurrent Neural Network." arXiv:1706.02257, Jun. 7, 2017.

Pan et al., "Virtual to Real Reinforcement Learning for Autonomous Driving." arXiv:1704.03952v3, May 11, 2017.

Pan, et al. "Agile Off-Road Autonomous Driving Using End-to-End Deep Imitation Learning." Sep. 21, 2017.

Sallab, et al. "Meta Learning Framework for Automated Driving." Jun. 11, 2017.

Santana et al., "Learning a Driving Simulator." arXiv:1608.01230v1, Aug. 3, 2016.

Shapiro, Danny. "Accelerating the Race to Autonomous Cars." Aug. 2016.

Skende, Andi, "Introducing 'Parker' Next-Generation Tegra System-On-Chip." Aug. 2016.

Stem et al., "Dissipation of stop-and-go waves via control of autonomous vehicles: Field experiemnts." ARxIV:1705.01693V1, May 4, 2017.

Teichmann et al., "MultiNet: Real-time Joint Semantic Reasoning for Autonomous Driving." arXiv:1612.07695v1, Dec. 22, 2016.

Wang, et al. "Reconfigurable Processor for Deep Learning in Autonomous Vehicles." International Telecommunication Union, Sep. 2017.

Wu et al., "SqueezeDet: Unified, Small, Low Power Fully Convolutional Neural Networks for Real-Time Object Detection for Autonomous Driving." arXiv:1612.01051v3, Nov. 29, 2017.

Xiaohang Zhan. "Mix-and-Match Tuning for Slef-Supervised Semantic Segmentation." Association for the Advancement of Artificial Intelligence (AAAI), 2018.

Yiran Zhong, et al. "Self-Supervised Learning for Stereo matching with Self-Improving Ability." arXiv:1709.00930v1, Sep. 4, 2017.

* cited by examiner

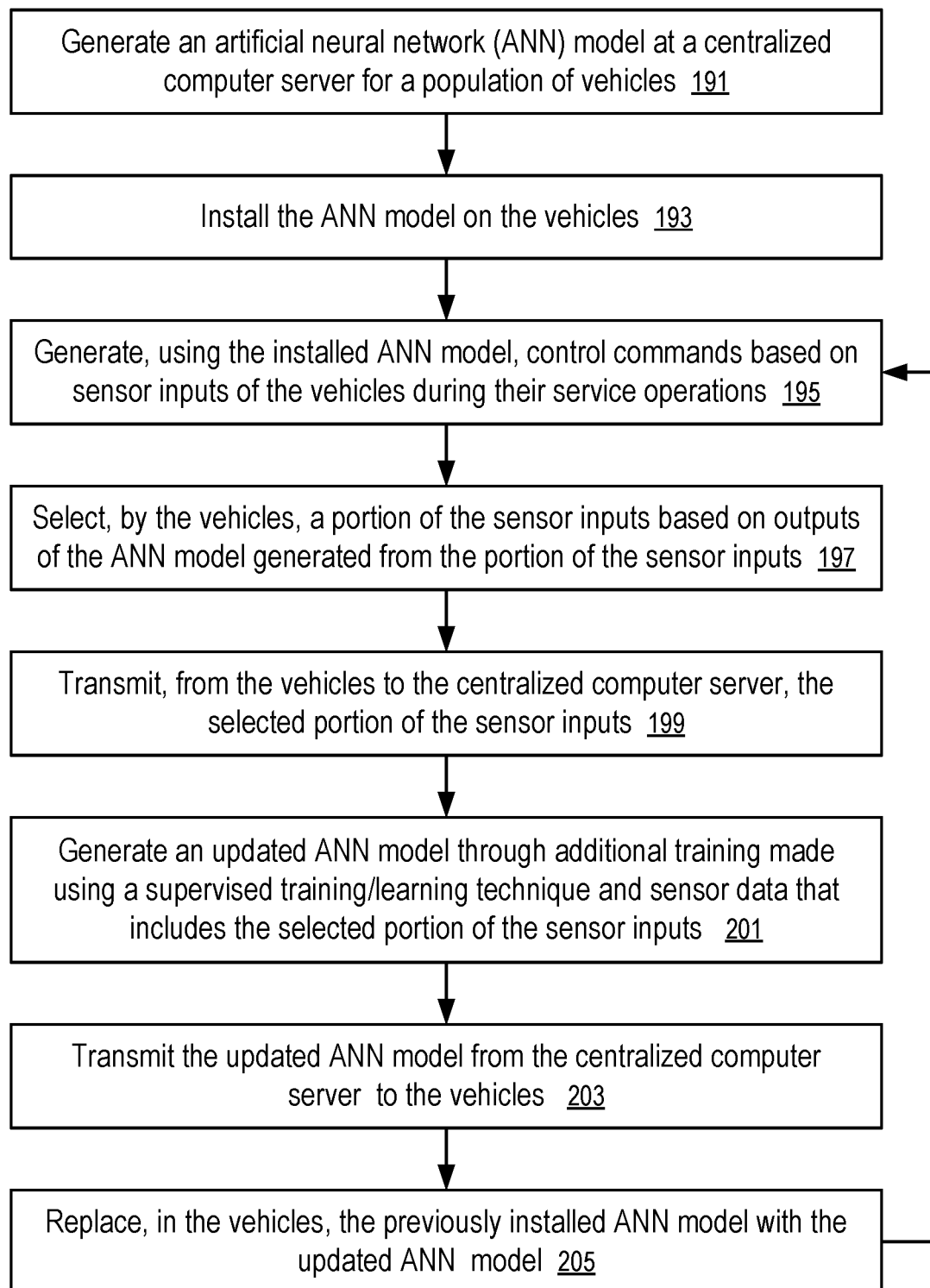

Generate an artificial neural network (ANN) model at a centralized computer server for a population of vehicles  191

Install the ANN model on the vehicles  193

Generate, using the installed ANN model, control commands based on sensor inputs of the vehicles during their service operations  195

Select, by the vehicles, a portion of the sensor inputs based on outputs of the ANN model generated from the portion of the sensor inputs  197

Transmit, from the vehicles to the centralized computer server, the selected portion of the sensor inputs  199

Generate an updated ANN model through additional training made using a supervised training/learning technique and sensor data that includes the selected portion of the sensor inputs  201

Transmit the updated ANN model from the centralized computer server  to the vehicles  203

Replace, in the vehicles, the previously installed ANN model with the updated ANN  model  205

FIG. 5

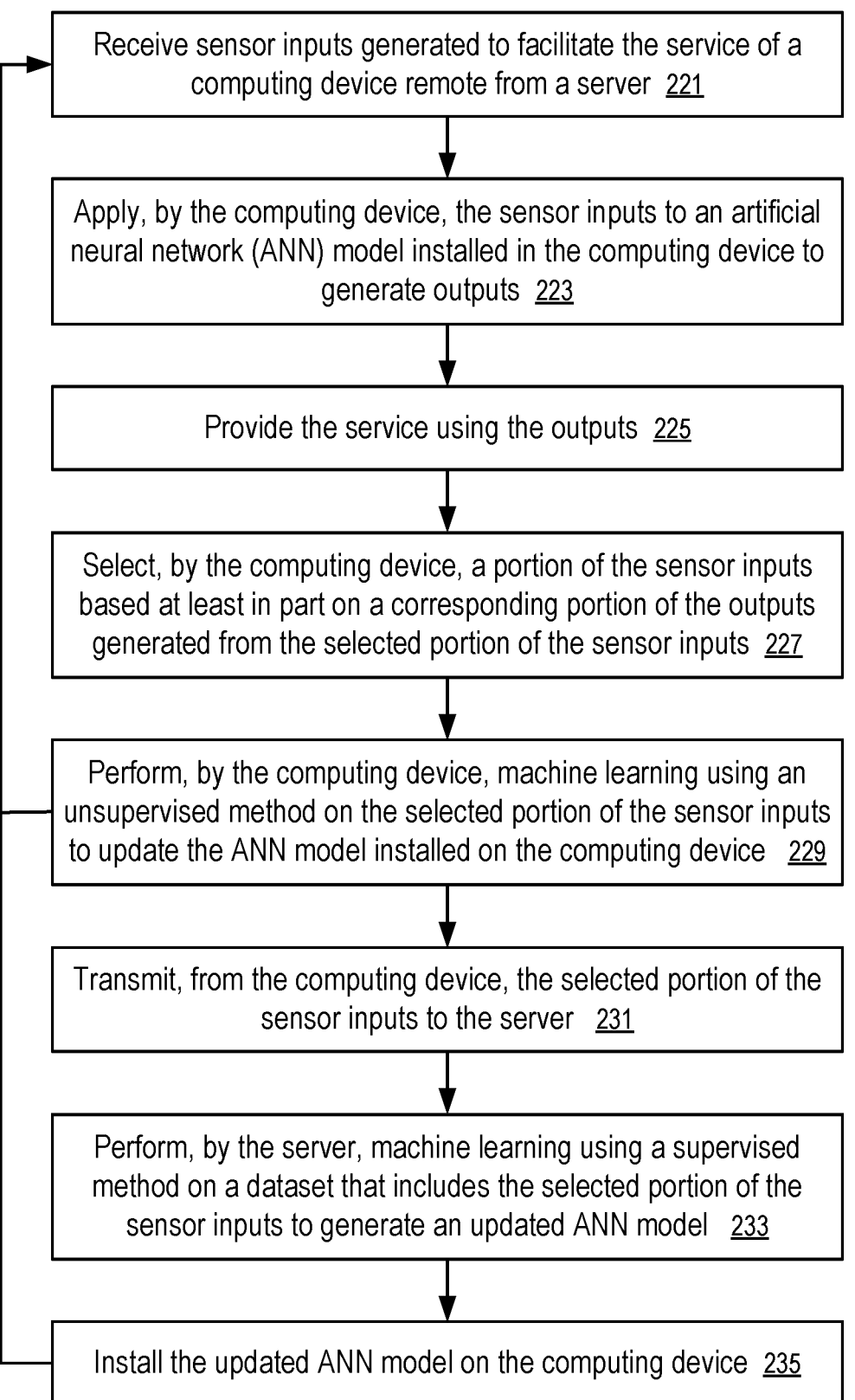

Receive sensor inputs generated to facilitate the service of a computing device remote from a server  221

Apply, by the computing device, the sensor inputs to an artificial neural network (ANN) model installed in the computing device to generate outputs  223

Provide the service using the outputs  225

Select, by the computing device, a portion of the sensor inputs based at least in part on a corresponding portion of the outputs generated from the selected portion of the sensor inputs  227

Perform, by the computing device, machine learning using an unsupervised method on the selected portion of the sensor inputs to update the ANN model installed on the computing device  229

Transmit, from the computing device, the selected portion of the sensor inputs to the server  231

Perform, by the server, machine learning using a supervised method on a dataset that includes the selected portion of the sensor inputs to generate an updated ANN model  233

Install the updated ANN model on the computing device  235

FIG. 8

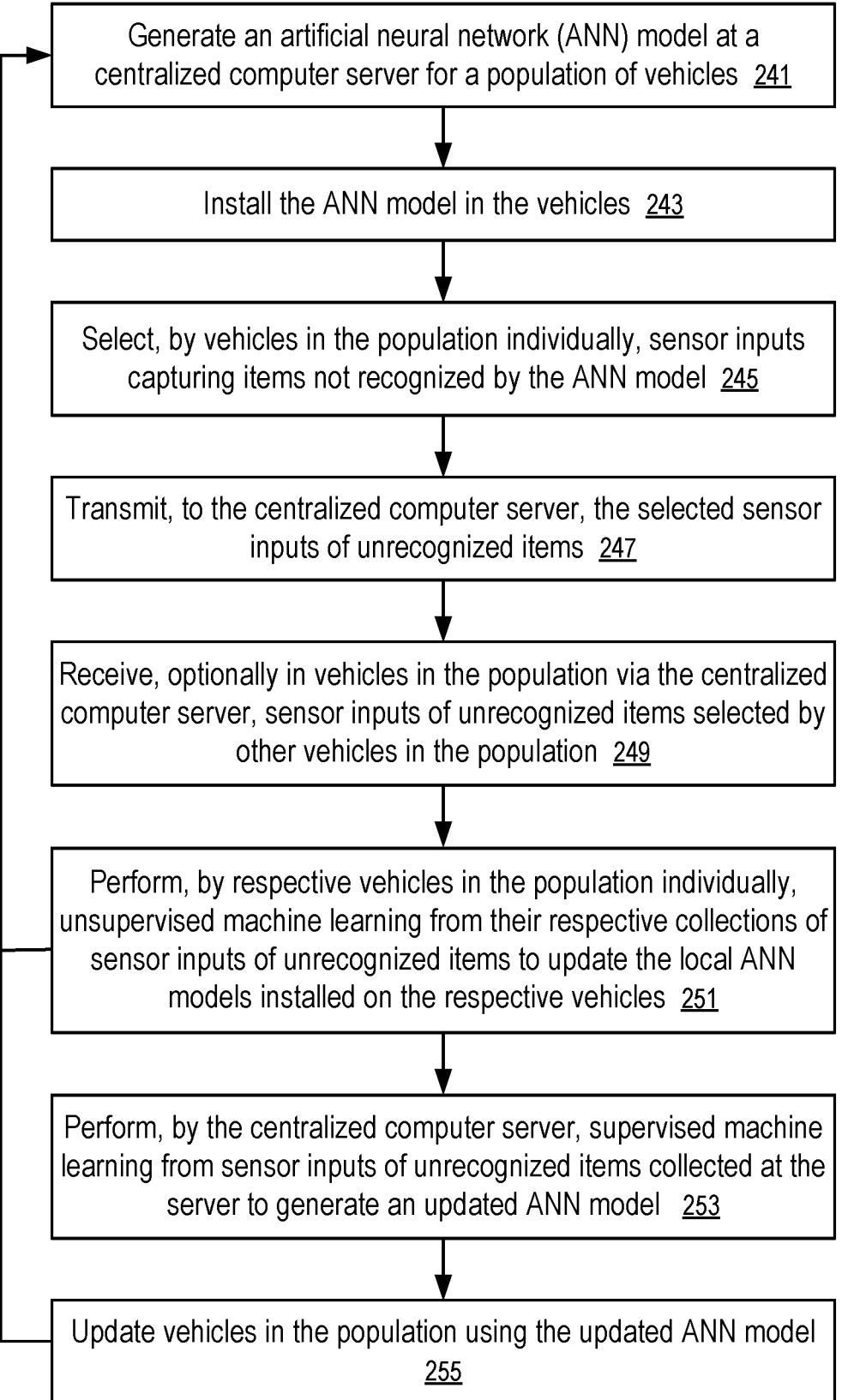

Generate an artificial neural network (ANN) model at a centralized computer server for a population of vehicles 241

Install the ANN model in the vehicles 243

Select, by vehicles in the population individually, sensor inputs capturing items not recognized by the ANN model 245

Transmit, to the centralized computer server, the selected sensor inputs of unrecognized items 247

Receive, optionally in vehicles in the population via the centralized computer server, sensor inputs of unrecognized items selected by other vehicles in the population 249

Perform, by respective vehicles in the population individually, unsupervised machine learning from their respective collections of sensor inputs of unrecognized items to update the local ANN models installed on the respective vehicles 251

Perform, by the centralized computer server, supervised machine learning from sensor inputs of unrecognized items collected at the server to generate an updated ANN model 253

Update vehicles in the population using the updated ANN model 255

FIG. 9

SELF-LEARNING IN DISTRIBUTED ARCHITECTURE FOR ENHANCING ARTIFICIAL NEURAL NETWORK

RELATED APPLICATIONS

The present application is a continuation application of U.S. patent application Ser. No. 15/858,505 filed Dec. 29, 2017, the entire disclosures of which application are hereby incorporated herein by reference.

The present application is related to U.S. patent application Ser. No. 15/858,143, filed on Dec. 29, 2017 and published as U.S. Pat. App. Pub. No. 2019/0205744 on Jul. 4, 2019, and entitled "Distributed Architecture for Enhancing Artificial Neural Network", the entire disclosure of which is hereby incorporated herein by reference.

TECHNICAL FIELD

At least some embodiments disclosed herein relates to artificial neural network in general and more particularly, but not limited to, artificial neural network for vehicle control.

BACKGROUND

Recent developments in the technological area of autonomous driving allow a computing system to operate, at least under some conditions, control elements of a vehicle without the assistance from a human operator of the vehicle.

For example, sensors (e.g., cameras and radars) can be installed on a vehicle to detect the conditions of the surroundings of the vehicle on a roadway. A computing system installed on the vehicle analyzes the sensor inputs to identify the conditions and generate control signals or commands for the autonomous adjustments of the direction and/or speed of the vehicle, without any input from a human operator of the vehicle.

Autonomous driving and/or advanced driver assistance system (ADAS) typically involves artificial neural network (ANN) for the identification of events and/or objects that are captured in sensor inputs.

In general, an artificial neural network (ANN) uses a network of neurons to process inputs to the network and to generate outputs from the network.

Each neuron m in the network receives a set of inputs $p_k$, where $k=1, 2, \ldots, n$. In general, some of the inputs to a neuron may be the outputs of certain neurons in the network; and some of the inputs to a neuron may be the inputs to the network as a whole. The input/output relations among the neurons in the network represent the neuron connectivity in the network.

Each neuron m has a bias $b_m$, an activation function $f_m$, and a set of synaptic weights $w_{mk}$ for its inputs $p_k$ respectively, where $k=1, 2, \ldots, n$. The activation function may be in the form of a step function, a linear function, a log-sigmoid function, etc. Different neurons in the network may have different activation functions.

Each neuron m generates a weighted sum $s_m$ of its inputs and its bias, where $s_m = b_m + w_{m1} \times p_1 + w_{m2} \times p_2 + \ldots + w_{mn} \times p_n$. The output $a_m$ of the neuron m is the activation function of the weighted sum, where $a_m = f_m(s_m)$.

The relations between the input(s) and the output(s) of an ANN in general are defined by an ANN model that includes the data representing the connectivity of the neurons in the network, as well as the bias $b_m$, activation function $f_m$, and synaptic weights $w_{mk}$ of each neuron m. Using a given ANN model a computing device computes the output(s) of the network from a given set of inputs to the network.

For example, the inputs to an ANN network may be generated based on camera inputs; and the outputs from the ANN network may be the identification of an item, such as an event or an object.

For example, U.S. Pat. App. Pub. No. 2017/0293808, entitled "Vision-Based Rain Detection using Deep Learning", discloses a method of using a camera installed on a vehicle to determine, via an ANN model, whether the vehicle is in rain or no rain weather.

For example, U.S. Pat. App. Pub. No. 2017/0242436, entitled "Road Construction Detection Systems and Methods", discloses a method of detecting road construction using an ANN model.

For example, U.S. Pat. Nos. 9,672,734 and 9,245,188 discuss techniques for lane detection for human drivers and/or autonomous vehicle driving systems.

In general, an ANN may be trained using a supervised method where the synaptic weights are adjusted to minimize or reduce the error between known outputs resulted from respective inputs and computed outputs generated from applying the inputs to the ANN. Examples of supervised learning/training methods include reinforcement learning, and learning with error correction.

Alternatively or in combination, an ANN may be trained using an unsupervised method where the exact outputs resulted from a given set of inputs is not known a priori before the completion of the training. The ANN can be trained to classify an item into a plurality of categories, or data points into clusters.

Multiple training algorithms are typically employed for a sophisticated machine learning/training paradigm.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

FIG. 5 shows a detailed method to select data for training an Artificial Neural Network (ANN) model according to one embodiment.

FIG. 8 shows a method with self-learning in updating an Artificial Neural Network (ANN) model according to one embodiment.

FIG. 9 shows a detailed method to enhance an Artificial Neural Network (ANN) model according to one embodiment.

DETAILED DESCRIPTION

Figure 1:
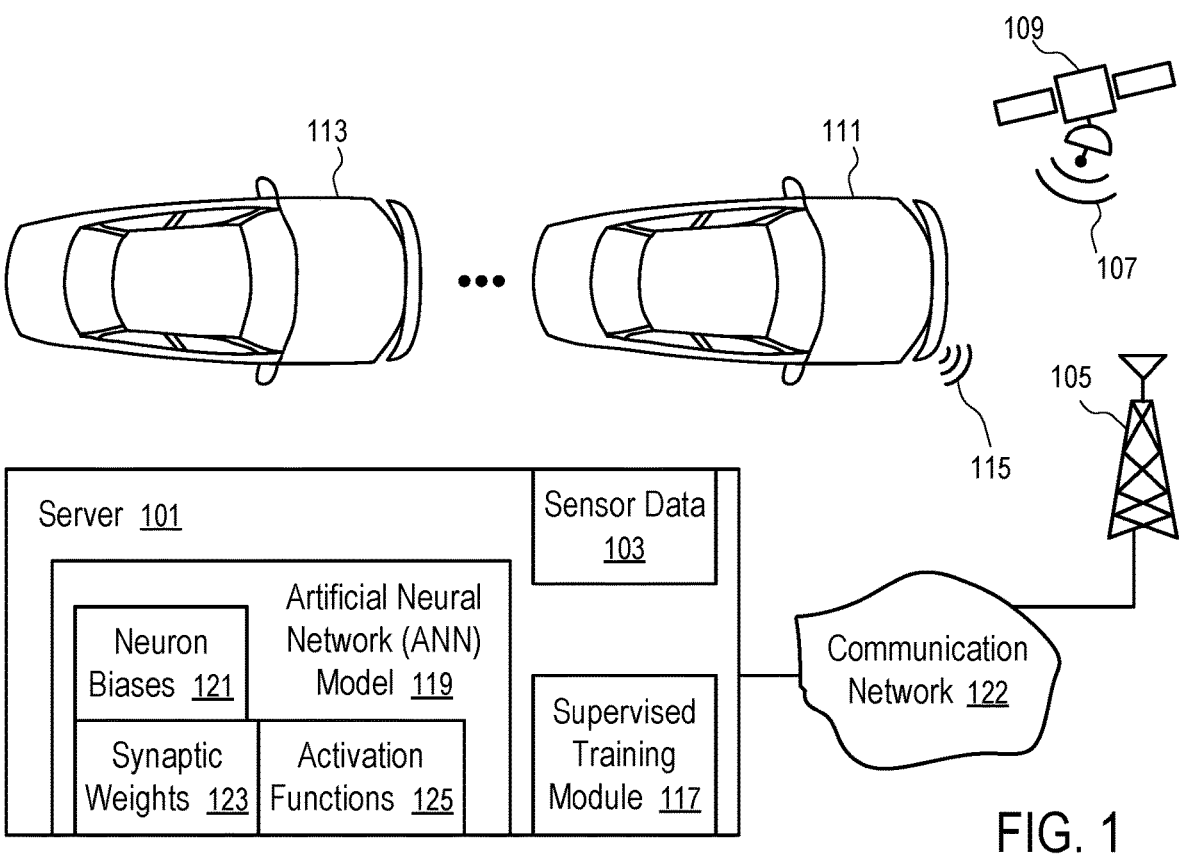
FIG. 1 illustrates a system to improve an Artificial Neural Network (ANN) model according to one embodiment.

At least some embodiments disclosed herein provide a distributed system for updating an Artificial Neural Network (ANN) model installed in vehicles, where a training dataset is constructed based on the outputs of the ANN model that are generated from sensor data collected by the vehicles during their real world services. Based on the characteristics of the outputs, the corresponding sensor inputs used to generate the outputs are selectively stored in the vehicles and/or transmitted from the vehicles to a centralized server, which performs further machine learning/training, using a supervised method and the selected sensor data, to generate an updated ANN model that can be subsequently loaded into the vehicles to replace their previously installed ANN model and to enhance the capabilities of the vehicles in processing future sensor data.

Optionally, the vehicles can be further configured to include a module implementing an unsupervised machine learning technique. The selected sensor inputs stored at the individual vehicles can be used by the module in self-learning to improve the ANN model(s) currently installed in the respective vehicles, prior to the availability of the updated ANN model generated by the centralized server using the supervised machine learning technique. A typical vehicle may store sensor data generated using its sensor(s) and/or receive (e.g., via the centralized server) sensor data selected by other vehicles. The entire collection of the sensor data available in a respective vehicle having the unsupervised learning/training model, including sensor inputs from its own sensor(s) and/or sensor inputs from sensors of other vehicles in the population, can be used in the unsupervised machine learning/training to improve the local ANN model currently installed in the respective vehicle, before the supervised machine learning/training results become available at the centralized server.

For example, when an ANN model is used by a vehicle to generate an output from a set of sensor data of the vehicle at an instance of service, the output can be examined to determine whether the output represents and/or indicates inaccuracy and/or incapability of the ANN model in processing the set of sensor data. If so, the set of sensor data is stored in the vehicle and/or transmitted from the vehicle to the centralized server to facilitate further machine learning/training to generate an updated ANN model such that when the updated ANN model is used, the vehicle can accurately process the set of sensor data and/or similar data.

For example, an ANN model can be applied to a set of sensor data capturing an event or object encountered by a vehicle on a roadway for the recognition of the event or object. If the ANN model has not being previously trained, or has not being sufficiently trained via machine learning, to recognize this particular types of events or objects, the ANN model may fail to positively label the event or object as one of known events or objects. In such a situation, the ANN model may produce an output that identify the event or object as unknown, or as one of several possible events or objects. When the ANN model recognizes the event or object as possibly being any of two or more known events or objects, the ANN model fails to generate a unique output and fails to produce an accurate recognition result. In such a situation, the ANN model is to be further trained, e.g., via a supervised machine learning technique, to properly and/or accurately process the sensor data for the recognition of the event or object, and/or similar events or objects, from sensor data generated in real world services.

In general, an ANN model trained to process input data in recognizing or classifying an item captured in input data, such as data associated with an event or an object, may encounter an unexpected item during its service time when the ANN model is being used in one of many devices, such as in vehicles having functions for autonomous driving and/or advanced driver assistance system (ADAS), in connected home devices having artificial intelligence (AI) functions, in industry 4.0 devices having AI functions for automation and data exchange in manufacturing, etc. Thus, the techniques discussed herein in connection with vehicles can also be used with other intelligent devices, such as those for connected homes, robots, manufacturing, etc.

FIG. 1 illustrates a system to improve an Artificial Neural Network (ANN) model according to one embodiment.

The system of FIG. 1 includes a centralized server (101) in communication with a set of vehicles (111, . . . , 113) via a communications network (122).

The server (101) includes a supervised training module (117) to train, generate, and update an artificial neural network (ANN) model (119) that includes neuron biases (121), synaptic weights (123), and activation functions (125) of neurons in a network used for processing sensor data generated in the vehicles (111, . . . , 113).

Once the ANN model (119) is designed, trained and implemented, e.g., for autonomous driving and/or advanced driver assistance system, the ANN model (119) can be deployed on a population of vehicles (111, . . . , 113) for real world usage in their respective environments.

Typically, the vehicles (111, . . . , 113) have sensors, such as a visible light camera, an infrared camera, a LIDAR, a RADAR, a sonar, and/or a set of peripheral sensors. The sensors of the vehicles (111, . . . , 113) generate sensor inputs for the ANN model (119) in autonomous driving and/or advanced driver assistance system to generate operating instructions, such as steering, braking, accelerating, driving, alerts, emergency response, etc.

During the operations of the vehicles (111, . . . , 113) in their respective service environments, the vehicles (111, . . . , 113) encounter items, such as events or objects, that are captured in the sensor data. The ANN model (119) is used by the vehicles (111, . . . , 113) to provide the identifications of the items to facilitate the generation of commands for the operations of the vehicles (111, . . . , 113), such as for autonomous driving and/or for advanced driver assistance.

Some of the encountered items may be unexpected and thus not fully considered in the design, training and/or implementation of the ANN model (119). As a result, the ANN model (119) may identify the unexpected item as unknown, or fails to classify the item into a single known category.

A function of the vehicles (111, . . . , 113) for autonomous driving and/or advanced driver assistance may process such an unknown item according to a pre-programmed policy. For example, as a response to the detection of an unknown event or object, the vehicle (111) may be programmed to avoid the item, initiate a safe-mode response, alert a human operator to take control, request assistance from a human operator, place the vehicle in a safer situation by keeping a distance, and/or slow down for a stop, etc.

When an output, generated by using the ANN model (119) from a particular sensor input, identifies an unknown item (or classifies an item with an insufficient precision or confidence level), the vehicle (e.g., 111) is configured to store the particular sensor input that is responsible for the output and/or transmit the sensor input to the centralized server (101). The sensor input selected and transmitted back to the server (101) enriches the sensor data (103) for the training and updating of the ANN model (119) through a supervised machine learning technique implemented in the training model (117).

For example, a vehicle (111) may communicate, via a wireless connection (115) to an access point (or base station) (105), with the server (101) to submit the sensor input to enrich the sensor data (103) as an additional dataset for machine learning implemented using the supervised training module (117). The wireless connection (115) may be made via a wireless local area network, a cellular communications network, and/or a communication link (107) to a satellite (109) or a communication balloon.

Optionally, the sensor input stored in the vehicle (111) may be transferred to another computer for uploading to the centralized server (101). For example, the sensor input can be transferred to another computer via a memory device, such as a Universal Serial Bus (USB) drive, and/or via a wired computer connection, a Bluetooth or WiFi connection, a diagnosis tool, etc.

Optionally, the sensor inputs for different instances of unexpected items encountered by the vehicle (111) during its real world services can be stored in the vehicle (111) and bundled together for transmission in a batch mode to the server (101) at a suitable time, such as a time of regularly scheduled maintenance services, or a time when the vehicle (111) is parked at a location having access to internet.

Optionally, the sensor input can be transmitted (e.g., using a cellular communications network) in real time during the operation of the vehicle and/or during the processing of the instance of encountering the unexpected item.

Optionally, the vehicle (111) may also select other sensor inputs based on the processing of the autonomous driving and/or advanced driver assistance system. For example, when a vehicle (111) is determined to be in an unsafe or undesirable condition, the vehicle (111) may provide to the server (101) the sensor inputs recorded for a time period leading to the condition.

Optionally, the vehicle (111) may also select some sensor inputs randomly to enrich the sensor data (103) for the training and updating of the ANN model (119).

Periodically, the server (101) runs the supervised training module (117) to update the ANN model (119). The server (101) may use the sensor data (103) enhanced with the sensor inputs from the vehicle (111) and/or from similar vehicles (e.g., 113) that are operated in the same geographical region or in geographical regions having similar traffic conditions to generate a customized version of the ANN model (119) for the vehicle (111).

Optionally, the server (101) uses the sensor data (103) enhanced with the sensor inputs from a general population of vehicles (e.g., 111, 113) to generate an updated version of the ANN model (119) for the general population.

Since the updated version of the ANN model (119) is trained, via machine learning, using the sensor inputs associated with the previously unexpected or unrecognized items to recognize and/or classify with certainty and accuracy these items and/or similar items. Thus, the capability of the ANN model (119) is enhanced.

The updated ANN model (119) can be downloaded to the vehicles (e.g., 111) via the communications network (122), the access point (or base station) (105), and communication links (115 and/or 107) as an over-the-air update of the firmware/software of the vehicles (e.g., 111). Alternatively, the update may be performed at an auto dealership or an authorized auto repair shop.

Optionally, the vehicle (111) has a self-learning capability. After an extended period on the road, the vehicle (111) may generate a new set of synaptic weights (123), neuron biases (121), activation functions (125), and/or neuron connectivity for the ANN model (119) installed in the vehicle (111) using the sensor inputs it collected and stored in the vehicle (111), such as the sensor inputs capturing the unexpected, unknown, and/or unrecognized events or objects.

As an example, the centralized server (101) may be operated by a factory, a producer or maker of the vehicles (111, . . . , 113), or a vendor of the autonomous driving and/or advanced driver assistance system for vehicles (111, . . . , 113).

Figure 2:
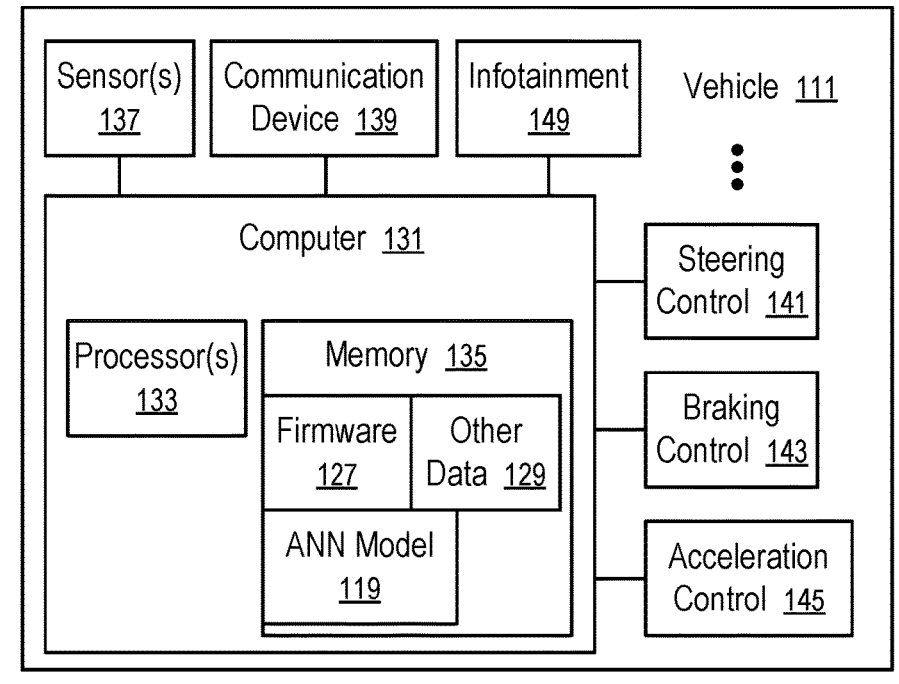
FIG. 2 shows an example of vehicles configured in the system of FIG. 1 to improve an Artificial Neural Network (ANN) model according to one embodiment.

FIG. 2 shows an example of vehicles configured in the system of FIG. 1 to improve an Artificial Neural Network (ANN) model according to one embodiment.

The vehicle (111) of FIG. 2 includes an infotainment system (149), a communication device (139), one or more sensors (137), and a computer (131) that is connected to some controls of the vehicle (111), such as a steering control (141) for the direction of the vehicle (111), a braking control (143) for stopping of the vehicle (111), an acceleration control (145) for the speed of the vehicle (111), etc.

The computer (131) of the vehicle (111) includes one or more processors (133), memory (135) storing firmware (or software) (127), the ANN model (119) (e.g., as illustrated in FIG. 1), and other data (129).

The one or more sensors (137) may include a visible light camera, an infrared camera, a LIDAR, RADAR, or sonar system, and/or peripheral sensors, which are configured to provide sensor input to the computer (131). A module of the firmware (or software) (127) executed in the processor(s) (133) applies the sensor input to an ANN defined by the model (119) to generate an output that identifies or classifies an event or object captured in the sensor input, such as an image or video clip.

The identification or classification of the event or object generated by the ANN model (119) can be used by an autonomous driving module of the firmware (or software) (127), or an advanced driver assistance system, to generate a response. The response may be a command to activate and/or adjust one of the vehicle controls (141, 143, and 145).

Optionally, the identification or classification of the event or object is presented to an occupant of the vehicle (111) via the infotainment system (149).

When the identification or classification of the current event or object is to be improved (e.g., when the event or object is identified as unknown, or identified as one of multiple possible events or objects, or identified as being an event or object with a confidence level below a threshold), the computer (131) selects the sensor input (e.g., the image or video clip, or data derived for the ANN from the image or video clip) for storage in the memory (135). Subsequently, or in real time, the computer (131) transmits the selected sensor input to the server (101) illustrated in FIG. 1 using the communication device (139).

The server (101) stores the received sensor input as part of the sensor data (103) for the subsequent further training or updating of the ANN model (119) using the supervised training module (117).

When an updated version of the ANN model (119) is available in the server (101), the vehicle (111) may use the communication device (139) to download the updated ANN model (119) for installation in the memory (135) and/or for the replacement of the previously installed ANN model (119).

Figure 3:
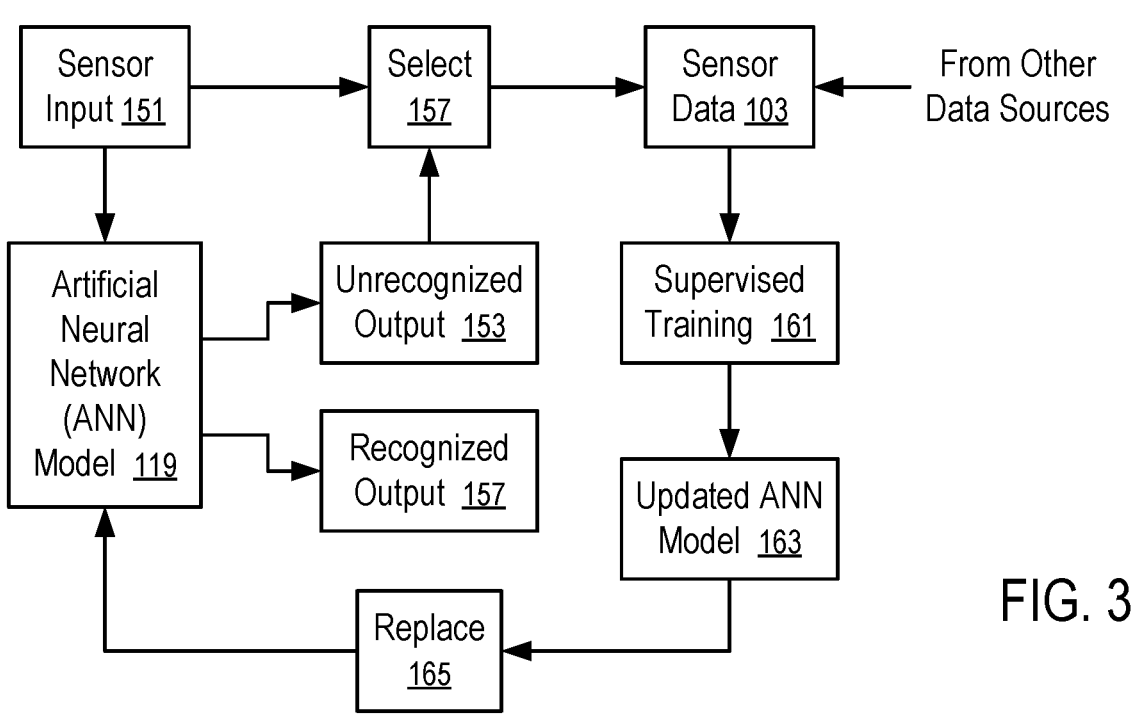
FIG. 3 shows operations to update an Artificial Neural Network (ANN) model according to one embodiment.

FIG. 3 shows operations to update an Artificial Neural Network (ANN) model according to one embodiment. For example, the operations of FIG. 3 can be performed in the system of FIG. 1 having a vehicle (111) of FIG. 2.

In FIG. 3, a sensor input (151) is obtained from one or more sensors, such as the sensor(s) (137) installed in the vehicle (111) of FIG. 2. For example, the sensor input (151) is based on an image or a video captured using a camera sensing visible lights and/or infrared lights, or a LIDAR, RADAR, or sonar system. For example, the image or video shows an event or an object in the surrounding of the vehicle (111) of FIG. 2 on a roadway.

The sensor input (151) is applied to the ANN model (119) installed in a computing device, such as the computer (131) of the vehicle (111) of FIG. 2, to generate an output, which may be a recognized output (157) or an unrecognized output (153). Based on the sensor input (151) causing the ANN model to generate the unrecognized output (153), the selection (157) of the corresponding sensor input (151) is performed, such that the sensor input (151) responsible for the generation of the unrecognized output (153) is selected as part of the sensor data (103)

The selected sensor input (151) is added to the sensor data (103) to form a training dataset for the supervised training (161) of the updated ANN model (163).

Optionally, the sensor data (103) may include contributions from other data sources, such as selected sensor input from other vehicles (e.g., 113).

Preferably, the sensor data (103) is collected at a centralized server (e.g., 101 illustrated in FIG. 1) which performs the supervised training to generate the updated ANN model (163) (e.g., using a supervised machine learning technique implemented in the supervised training module (117) illustrated in FIG. 1).

The updated ANN model (163) is to replace (165) the previously installed ANN model (119) in the corresponding computing device, such as the computer (131) of the vehicle (111) of FIG. 2. For example, when the computer (131) of the vehicle (111) uses the previously installed ANN model (119), the computer (131) generates the unrecognized output (153) from the sensor input (151) (or similar inputs). When the computer (131) of the vehicle (111) uses the updated ANN model (163), the computer (131) is capability of generating the recognized output (157) from the sensor input (151) (or similar inputs). Thus, the capability of the vehicle (111) is improved by storing and using the updated ANN model (163) in the memory (135) of its computer (131).

The operations of FIG. 3 can also be performed in other intelligent systems that use ANN models in a population of computing devices at various service locations to process sensor data, such as a connected home system with intelligent devices powered by ANN models and sensors, or an industry 4.0 system with devices powered by ANN models and sensors.

Figure 4:
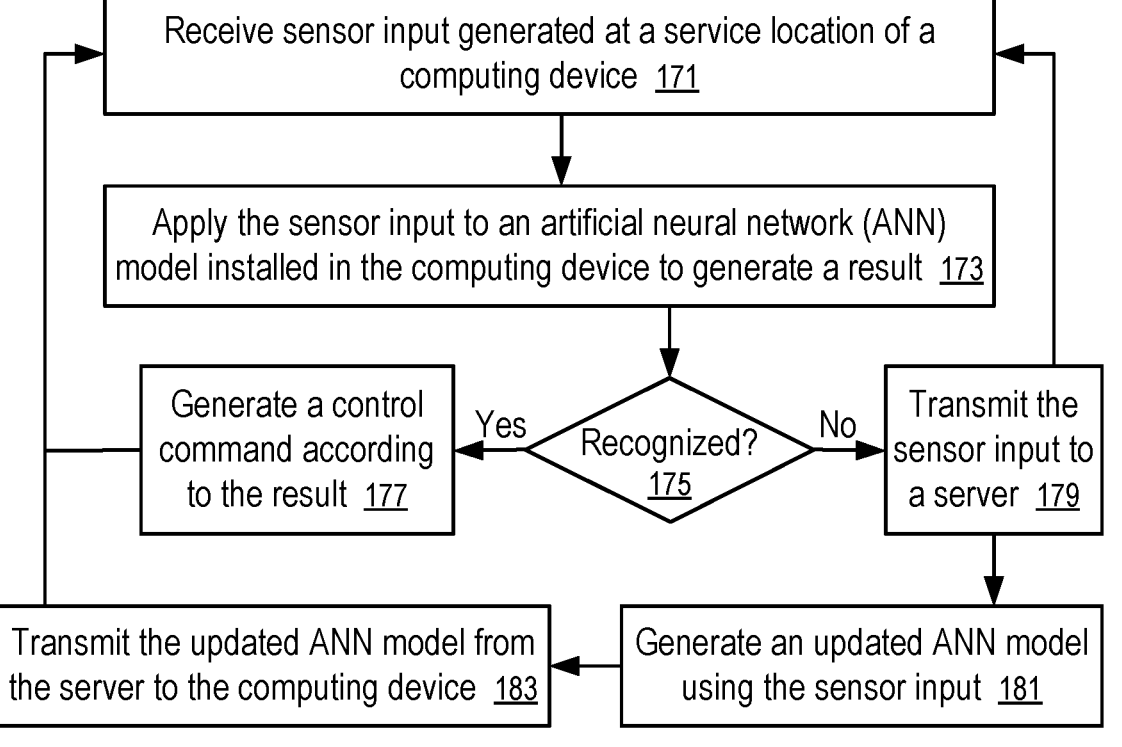
FIG. 4 shows a method to update an Artificial Neural Network (ANN) model according to one embodiment.

FIG. 4 shows a method to update an Artificial Neural Network (ANN) model according to one embodiment. For example, the method of FIG. 4 can be performed at least in part in the vehicle (111) of FIG. 2 in the system of FIG. 1. The method of FIG. 4 can also be performed in another ANN powered device, such as a connected home device or an industry 4.0 device, in a distributed system similar to that illustrated in FIG. 1.

The method of FIG. 4 includes: receiving (171) sensor input (151) generated at a service location of a computing device (e.g., 131); applying (173) the sensor input (151) to an artificial neural network (ANN) model (119) installed in the computing device (e.g., 131) to generate a result (e.g., 153 or 157); determining (175) whether the result is a recognized result (e.g., 157) or an unrecognized result (e.g., 153).

If it is determined (175) that the result is a recognized result (e.g., 157), the method of FIG. 4 further includes generating (177) a control command according to the result (without transmitting the sensor input to a centralized server (e.g., 101)); otherwise, the computing device (e.g., 131) transmits (179) the sensor input (151) to the centralized server (e.g., 101) to cause the centralized server (101) to generate (181) an updated ANN model (163) using the sensor input (151) at the centralized server (e.g., 101). The updated ANN model (163) is transmitted (183) from the server to the computing device (e.g., 131) to update its ANN capability.

FIG. 5 shows a detailed method to select data for training an Artificial Neural Network (ANN) model according to one embodiment. For example, the method of FIG. 5 can be performed in the system of FIG. 1 for vehicles illustrated in FIG. 2 using the techniques of FIG. 3 and/or FIG. 4.

The method of FIG. 5 includes: generating (191) an artificial neural network (ANN) model (119) at a centralized computer server (101) for a population of vehicles (111, . . . , 113); installing (193) the ANN model (119) on the vehicles (111, . . . , 113); generating (195), using the installed ANN model (119), control commands based on sensor inputs (151) of the vehicles (111, . . . , 113) during their service operations; selecting (197), by the vehicles (111, . . . , 113), a portion of the sensor inputs (e.g., 151) based on the outputs (e.g., 153) of the installed ANN model (119) that are generated from the portion of the sensor inputs (e.g., 151); transmitting (199), from the vehicles (111, . . . , 113) to the centralized computer server (101), the selected portion of the sensor inputs (e.g., 151) as the sensor data (103) for further training through supervised machine learning; generating (201) an updated ANN model (163) through additional training (161) made using a supervised training/learning technique and using the sensor data (103) that includes the selected portion of the sensor inputs (151); transmitting (203) the updated ANN model (163) from the centralized computer server (101) to the vehicles (111, . . . , 113); and replacing (205), in the vehicles (111, . . . , 113), the previously installed ANN model (119) with the updated ANN model (163).

For example, in the method of FIG. 5, the outputs of the ANN model (119 or 163) can be used to control (e.g., 141, 143, 145) the acceleration of a vehicle (e.g., 111), the speed of the vehicle (111), and/or the direction of the vehicle (111), during autonomous driving or provision of advanced driver assistance.

Typically, when the updated ANN model (153) is generated, at least a portion of the synaptic weights (123) of some of the neurons in the network is updated. The update may also adjust some neuron biases (121) and/or change the activation functions (125) of some neurons. In some instances, additional neurons may be added in the network. In other instances, some neurons may be removed from the network.

In the method of FIG. 5, the portion of the sensor inputs (e.g., 151) can be selected (197) based on one or more characteristics of the outputs that cause the selection of the corresponding sensor inputs (e.g., 151) that generate the corresponding outputs.

For example, a sensor input (151) may be an image or video that captures an event and/or an object using a camera that images using lights visible to human eyes, or a camera that images using infrared lights, or a sonar, radar, or lidar system. The sensor input (151) can be selected (157,197) in response to the output (e.g., 153), generated from the respective selected sensor input (151), identifying an unknown item, identifying an item unexpected in the development of the initial artificial neural network model (119), and/or identifying an item, such as an event or an object captured in the input (151), as being one of two or more possible candidates.

For example, the sensor input (151) can be selected (197) for generating an output (153) that has the characteristic of lack of knowledge about an item captured in the sensor input (151), lack of a definite classification of the item in a plurality of known categories, lack of a predetermined identification of the item, having below a threshold an accuracy in the identification or classification of the item, and/or having below a threshold a confidence level in recognizing of the item, etc.

In some instances, the updated ANN model (163) is customized for a particular vehicle (111) based on the sensor inputs (151) selected by the particular vehicle (111). In other instances, the updated ANN model (163) is generic for using sensor inputs (e.g., 151) selected by the population of the vehicles (111, . . . , 113) in service.

The transmitting (199) of the selected portions may be performed in real time by the respective vehicles during their processing of the outputs from the currently installed ANN model (119). Alternatively, each vehicle (e.g., 111) may save a set of selected sensor inputs (e.g., 151) and schedule their transmission at a convenient time, such as during a maintenance or repair service at a dealership, at a night time while being parked at a location having access to internet, etc.

The vehicles (111, . . . , 113) can be optionally configured with a self-learning module that incrementally trains their respective ANN models using at least the sensor inputs (151) identified by the respective vehicles (111, . . . , 113) and using an unsupervised machine learning/training technique. Optionally, the vehicles (111, . . . , 113) may further collect sensor inputs (151) from other vehicles (111, . . . , 113) in the population for the unsupervised local learning/training, before the new sensor inputs can be used to obtain an updated ANN model using a supervised machine learning/ training method.

For example, in addition to selecting sensor inputs (151) that generates unrecognized outputs (153) (and/or other outputs (e.g., 157)) on a vehicle (113), the vehicle (113) may receive sensor inputs (e.g., 151) selected by a nearby vehicle (111) via a peer to peer communication connection, or via selectively retrieving a portion of the sensor data (103), from a centralized server (101), that was previously uploaded to the centralized server (101) by other vehicles (e.g., 111). In general, different vehicles (111, . . . , 113) have different self-learning paths, depending on the different sensor inputs available at different time instances of self-learning in different vehicles (111, . . . , 113), and/or the sequences of the application unsupervised local learning/training using their respective datasets for training/learning. Thus, at a given instance in time, different vehicles (111, . . . , 113) in the population may have differently trained/updated versions of the ANN model (119) as a result of the self-learning performed by the vehicles (111, . . . , 113). When the updated ANN model (163) is generated via a supervised training (161) and distributed to the vehicles (111, . . . , 113) in the population, the vehicles (111, . . . , 113) become synchronized in their capability in recognizing items via ANN. Subsequent self-learning may then further introduce differences in their capability in recognizing items via ANN, depending on their subsequent usages on roadways. The process can be repeated through cycles of global updates from the centralized server via supervised machine learning/ training and, between the cycles, local updates by the individual vehicles performed via unsupervised machine learning/training.

Figures 6, 7:
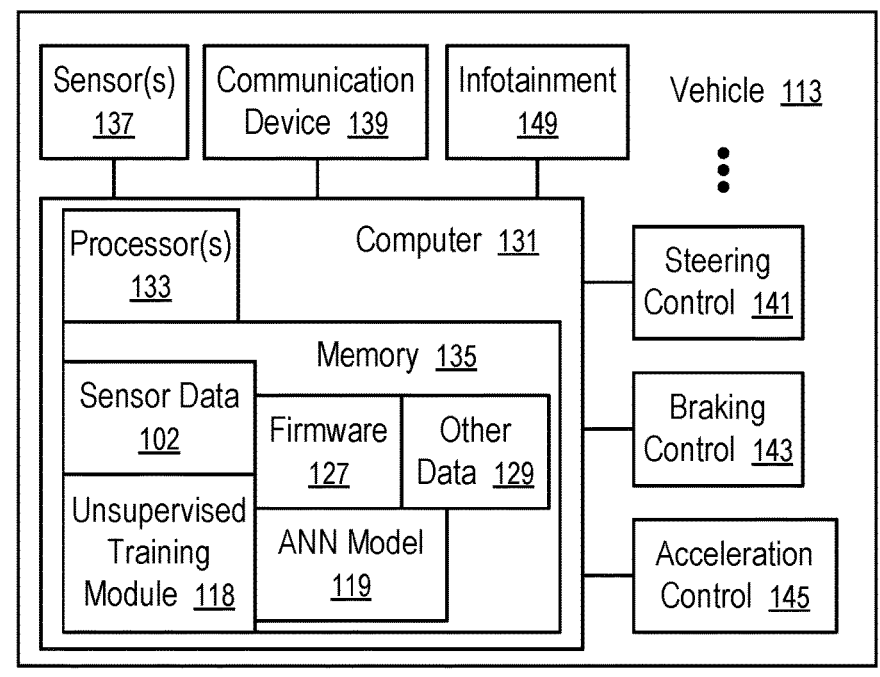
FIG. 6 shows another example of vehicles configured in the system of FIG. 1 to improve an Artificial Neural Network (ANN) model according to one embodiment.
FIG. 7 shows operations with self-learning in updating an Artificial Neural Network (ANN) model according to one embodiment.

FIG. 6 shows another example of vehicles configured in the system of FIG. 1 to improve an Artificial Neural Network (ANN) model according to one embodiment. For example, the vehicle (113) of FIG. 6 can be implemented by adding additional functions to the vehicle (111) of FIG. 2.

The vehicle (113) in FIG. 6 includes an unsupervised training module (118) that allows the computer (131) of the vehicle (113) to further train its ANN model (119) using sensor data (102) available in the memory (135) of the vehicle (113) without a priori knowledge about the outputs for the inputs used in the training.

The sensor data (102) available in the memory (135) of the vehicle (113) is generally different from the sensor data (103) stored at the same time in the server (101).

In some instances, the sensor data (102) used in the vehicle (113) for the unsupervised training module (118) is limited to the sensor inputs generated by the sensor(s) (137) of the same vehicle (113).

The sensor data (102) for the unsupervised training module (118) in the vehicle (113) generally includes the sensor inputs (e.g., 151) generated by the sensor(s) (137) of the same vehicle (113). The sensor data (102) may be selected according to the characteristics of the previous outputs from the ANN model (119) (or the previous version of the ANN model (119) previously installed in the vehicle (113) during the time instances of the services of the previous version). The characteristics of the outputs used to make the selection can be those indicating that the selected sensor data (151) include unknown or unrecognized items, or items recognized with a confidence level or accuracy below a threshold.

The sensor data (102) for the unsupervised training module (118) in the vehicle (113) may optionally include sensor inputs, generated by the sensor(s) (137) of the same vehicle (113), that are selected using other criteria, such as sensor inputs selected randomly or based on a time period prior to the use of the unsupervised training module (118).

The sensor data (102) for the unsupervised training module (118) in the vehicle (113) may optionally include the sensor inputs generated by the sensor(s) (137) of another vehicle (111). For example, after a nearby vehicle (111) uploads its selected sensor inputs (151) to the centralized server (101), the vehicle (113) having the unsupervised training module (118) and/or the centralized server (101) may make the determination to load the sensor inputs (151) selected by the nearby vehicle (111) for the unsupervised learning module (118) in the vehicle (113). The determination can be made based on the likelihood of the vehicle (111) encountering the same or similar items that are in the sensor inputs (151) uploaded to the centralized server (101) by the nearby vehicle (111).

For example, when the vehicles (111 and 113) are operated in a same geographical area and/or in the same neighborhood, the likelihood that the vehicles (111 and 113) encountering the same or similar unknown items is high. Thus, the sensor inputs (151) showing the unrecognized items reported by one vehicle (111) in the geographical area or neighborhood can be transmitted to another vehicle (113) for self-learning, before the centralized server (101) generates, via supervised training (161), an updated ANN model (163) trained to process sensor inputs (151) containing such unrecognized items.

For example, when the vehicles (111 and 113) have been operated on the same roadway during a same period of time (e.g., a day, a week, a month), the sensor inputs (151) of unrecognized items encountered by one vehicle (111) on the roadway may be relevant to the subsequent services of another vehicle (113). Since the vehicle (113) is likely to encounter such unrecognized items on the roadway in a subsequent time period, the sensor inputs (151) reported by the vehicle (111) may be provided to the vehicle (113) for self-learning.

In some instances, the centralized server (101) correlates vehicles (e.g., 111 and 113) based on the correlations in known items captured in the sensor data (103) submitted by the respective vehicles (e.g., 111 and 113). When the vehicles (e.g., 111 and 113) have a similar spectrum of known items captured in their respective sensor inputs, the vehicles (e.g., 111 and 113) are likely to encounter similar unknown items. Further, the correlated vehicles having similar profiles of encountered known items can be processed to generate a predictive model of vehicles having high likelihood of encountering similar known or unknown items. Thus, from the attributes of a vehicle (113), the predictive model can identify a set of vehicles (e.g., 111) that are likely to have encountered items that the vehicle (113) is likely to encounter. The sensor data from the identified set of vehicles (e.g., 111) can be selected and transmitted to the vehicle (113) as part of the sensor data (102) for the application of the unsupervised training model (118). Examples of the attributes used in the predictive model may include when, where and/or how the vehicles are operated and/or the attributes of the users of the vehicles (e.g., 111 and 113). The predictive model may be constructed using an ANN and/or a statistical tool.

The communication of the sensor inputs (151) from one vehicle (111) to another vehicle (113) may be restricted in view privacy concerns and/or user preferences.

For example, when the sensor inputs (151) is obtained when the vehicle (111) is operated on a public environment (e.g., on a public roadway), the sensor inputs (151) may be allowed to be provided to another vehicle (113).

For example, when the sensor inputs (151) is obtained when the vehicle (111) is operated on an environment that may cause privacy concerns (e.g., on a private roadway), the sensor inputs (151) may be prevented from being transmitted to another vehicle (113).

In some instances, the owner or user of the vehicle (111) may opt in to share the sensor inputs (151) with other vehicles (e.g., 113) for unsupervised training under certain conditions, but opt out under other conditions.

In FIG. 6, the sensor data (102) includes a sensor input (151) capturing an item that is not recognized by the currently installed ANN model (119). When the unsupervised training module (118) is applied to adjust the ANN model (119) according to the sensor input (151), the adjusted ANN model (119) is improved in processing the sensor input (151).

For example, the adjusted ANN model (119) may recognize the item as one of a set of known items within a certain tolerance level.

In some instances, the adjusted ANN model (119) may increase the accuracy or confidence level in identifying the item captured in the sensor input (151) as one of known categories or classifications of items.

In some instances, the adjusted ANN model (119) may decrease the ambiguity in identifying, classifying, recognizing the item shown in the sensor input (151).

The unsupervised training module (118) generally adjusts the organizations of items captured in sensor data (e.g., 102) relative to each other in general, without knowing a priori the exact identification of an item captured in the sensor data (102). For example, an item that is determined, according to the ANN model (119) before the training, be not within any of a plurality of known clusters may be found, according to the ANN model (119) after the training, to be sufficiently close to one of the known clusters and thus be classified to the corresponding cluster; and thus, after the training the item can be identified as a member of a known cluster with a sufficient confidence level. After identifying the item as being in the known cluster, the vehicle (113) may generate control commands according to pre-programmed policies for responding to items in the known cluster.

In some instances, a set of items may be entirely new to the known clusters in the ANN model (119) and thus not close to any of the known clusters. Thus, the unsupervised learning made via the sensor data (102) and the unsupervised training model (118) may not be able to positively identify, classify, or recognize such items. However, when there are structures within the set of unknown items, the structures can be identified from the unsupervised machine learning.

For example, the unknown items may be classified into one or more distinct clusters that can be named subsequently (e.g., for the supervised training (161) at the centralized server (101)). The vehicle (113) may optionally learn to respond to the different unknown clusters differently (e.g., based on inputs from the user of the vehicle (113)) and/or results of motion relations between the vehicle (113) and the items in the respective clusters.

For example, the vehicle (113) may use the classification of the unknown clusters to organize the storing and reporting of the sensor inputs (e.g., 151) to the centralized server (101).

FIG. 7 shows operations with self-learning in updating an Artificial Neural Network (ANN) model according to one embodiment. For example, the operations of FIG. 7 can be performed in the system of FIG. 1 having a vehicle (113) of FIG. 6, or in a population of devices for connected homes, or in a population of industry 4.0 devices for smart manufacturing.

In FIG. 7, local sensor inputs (151) are obtained from one or more sensors at one or more service locations of a local computing device.

For example, the local sensor inputs (151) for the computer (131) of the vehicle (113) of FIG. 6 are generated by the sensor(s) (137) locally installed in the vehicle (113) at one or more service locations along a roadway. For example, a connected home device or an industry 4.0 device, configured in a distributed system having a population of different devices, obtains the local sensor inputs (151) from their respective local sensors.

The local sensor inputs (151) may be generated, for example, using a camera sensing visible lights and/or infrared lights, or a LIDAR, RADAR, or sonar system, in the form of an image or a video capturing an item, such as an event or an object. The local sensor inputs (151) may include data representing the image or video, and/or input data extracted or derived from the image or video.

When the sensor inputs (151) are applied to an artificial neural network (ANN) defined by the ANN model (119), the outputs (e.g., 153 and 157) are computed by the respective computing device (e.g., the computer (131) of the vehicle (113) of FIG. 6).

When the ANN model (119) generates an unrecognized outputs (153), the corresponding sensor input (151) that causes the generation of the unrecognized outputs (153) is selected, in a way similar to the selection (157) discussed in connection with FIG. 3 and/or the selection (197) discussed in connection with FIG. 5.

In FIG. 6, the sensor inputs (151) for the unrecognized outputs (153) are selected (157) and/or stored as part of the local sensor data (102). The local computing device (e.g., the vehicle (113) of FIG. 6, a connected home device, or an industry 4.0 device) may transmit its selected sensor inputs to a centralized server (e.g., 101) to contribute to centralized sensor data (103) stored in the centralized server (e.g., 101).

The centralized sensor data (103) typically includes local sensor data selected by multiple local computing devices in a way similar to the selection (157) of the local sensor data (102) by the particular local computing device that locally uses the instance of ANN model (119), such as local sensor data (151) selected by the vehicle (111) of FIG. 2 and local sensor data (151) selected by the vehicle (113) of FIG. 6 (or a set of connected home devices, or a set of industry 4.0 devices).

Optionally, the centralized server (e.g., 101) communicates, to the local computing device (e.g., vehicle (113) of FIG. 6), the contributions to the centralized sensor data (103) made by other local computing devices (e.g., vehicle (111) of FIG. 2), to augment the set of local sensor data (102) used by the local computing device (e.g., vehicle (113) of FIG. 6) in the unsupervised training (162) of the local ANN model (119) for the generation the local, updated ANN model (164). The local updated ANN model (164) may include updated neuron biases (121), updated synaptic weights (123), updated activation functions (125), and/or the updated neuron connectivity.

Optionally, the local computing device (e.g., the computer (131) of the vehicle (113) of FIG. 6, a connected home device, or an industry 4.0 device) may also use the local sensor inputs (151) responsible for the recognized outputs (157) in the unsupervised training (162) of the local ANN model (119) for the generation the local, updated ANN model (164).

The local, updated ANN model (164) replaces (165) the previous version of the local ANN model (164) to dynamically update the capability of the local computing device (e.g., the computer (131) of the vehicle (113) of FIG. 6, a connected home device, or an industry 4.0 device).

The unsupervised training (162) and/or model replacement (165) can be performed substantially in real time when the data in the set of local sensor data (102) and/or the recognized output (157) become available, or periodically. For example, the vehicle (113) may perform the unsupervised training (162) and/or model replacement (165) at scheduled self-maintenance times when the local device is not in active driving operations and/or when the vehicle (113) is in a parking mode.

In FIG. 7, the centralized sensor data (103) is used in the supervised training (161) for the generated of a global, updated ANN model (163), in a way similar to the generation (201) of the updated ANN model (163) discussed in FIG. 3 and/or FIG. 5. Periodically, or at a suitable time, the updated ANN model (163) generated via the supervised training (161) from the centralized sensor data (103) is downloaded (e.g., from the centralized server (101)) to the local computing device (e.g., the computer (131) of the vehicle (113) of FIG. 6 and/or the vehicle (111) of FIG. 2, or a connected home device, or an industry 4.0 device) to replace the local ANN model (119) which may or may not have been updated via the unsupervised training (162). The updated ANN models (164 and 163) can be generated repeatedly at the local computing device (e.g., the computer (131) of the vehicle (113) of FIG. 6) and at the centralized computer server (101) respectively. In some instances, the result of the unsupervised training (162) is also provided to the centralized server (e.g., 101) to reduce the computation workload of the supervised training (161).

FIG. 8 shows a method with self-learning in updating an Artificial Neural Network (ANN) model according to one embodiment. For example, the method of FIG. 8 can be performed at least in part in the vehicle (113) of FIG. 6 in the system of FIG. 1. The method of FIG. 8 can also be performed in another ANN powered device, such as a connected home device or an industry 4.0 device, in a distributed system similar to that illustrated in FIG. 1.

The method of FIG. 8 includes: receiving (221) sensor inputs (151) generated to facilitate the service of a computing device (e.g., the computer (131) of the vehicle (113), a connected home device, or an industry 4.0 device) remote from a server (e.g., 101); apply (223), by the computing device, the sensor inputs (151) to an artificial neural network (ANN) model (119) installed in the computing device to generate outputs (e.g., 153 and 157); providing (225) the service using the outputs (e.g., 153 and 157); selecting (227), by the computing device, a portion of the sensor inputs (151) based at least in part on a corresponding portion (153) of the outputs (e.g., 153 and 157) generated from the selected portion of the sensor inputs (151); performing (229), by the computing device, machine learning using an unsupervised method (e.g., 162) on the selected portion of the sensor inputs (151) to update the ANN model (119) installed on the computing device; transmitting (231), from the computing device, the selected portion of the sensor inputs (151) to the server; performing (233), by the server, machine learning using a supervised method (e.g., 161) on a dataset (e.g., 103) that includes the selected portion of the sensor inputs (103), to generate an updated ANN model (163); and installing (235) the updated ANN model (163) on the computing device.

FIG. 9 shows a detailed method to enhance an Artificial Neural Network (ANN) model according to one embodiment. For example, the method of FIG. 9 can be performed in the system of FIG. 1 for vehicles illustrated in FIGS. 1 and 2 using the techniques of FIG. 7 and/or FIG. 8.

The method of FIG. 9 includes: generating (241) an artificial neural network (ANN) model (119) at a centralized computer server (101) for a population of vehicles (111, . . . , 113); installing (243) the ANN model (119) in the vehicles (111, . . . , 113); selecting (245), by vehicles (111, . . . , 113) in the population individually, sensor inputs (151) capturing items not recognized (e.g., as indicated in the unrecognized outputs (153)) by the ANN model (119) installed in the respective vehicles (111, . . . , 113); transmitting (247), to the centralized computer server (101), the selected sensor inputs (151) of unrecognized items (e.g., as indicated in the unrecognized outputs (153)); receiving (249), optionally in vehicles (e.g., 113) in the population via the centralized computer server (101), sensor inputs of unrecognized items (e.g., as indicated in the unrecognized outputs (153)) selected by other vehicles (e.g., 111) in the population; performing (251), by respective vehicles (e.g., 113) in the population individually, unsupervised machine learning (162) from their respective collections (e.g., 102) of sensor inputs of at least unrecognized items to update (164 and 165) the local ANN models installed on the respective vehicles; performing (253), by the centralized computer server (101), supervised machine learning (161) from at least sensor inputs (103) of unrecognized items (e.g., as indicated in the unrecognized outputs (153)) collected at the server to generate an updated ANN model (163); and updating (255) vehicles (111, . . . , 113) in the population using the updated ANN model (163).

The present disclosure includes methods and apparatuses which perform these methods, including data processing systems which perform these methods, and computer readable media containing instructions which when executed on data processing systems cause the systems to perform these methods.

Each of the server (101) and the computer (131) of a vehicle (111, . . . , or 113) can be implemented as one or more data processing systems.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a micropro-cessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a comput-ing product in a variety of forms and are capable of being applied regardless of the particular type of machine or computer-readable media used to actually effect the distri-bution.

At least some aspects disclosed can be embodied, at least in part, in software. That is, the techniques may be carried out in a computer system or other data processing system in response to its processor, such as a microprocessor, execut-ing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer pro-grams." The computer programs typically include one or more instructions set at various times in various memory and storage devices in a computer, and that, when read and executed by one or more processors in a computer, cause the computer to perform operations necessary to execute ele-ments involving the various aspects.

A machine readable medium can be used to store software and data which when executed by a data processing system causes the system to perform various methods. The execut-able software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different central-ized servers and/or peer to peer networks at different times and in different communication sessions or in a same com-munication session. The data and instructions can be obtained in entirety prior to the execution of the applica-tions. Alternatively, portions of the data and instructions can be obtained dynamically, just in time, when needed for execution. Thus, it is not required that the data and instruc-tions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digi-tal Versatile Disks (DVDs), etc.), among others. The com-puter-readable media may store the instructions.

The instructions may also be embodied in digital and analog communication links for electrical, optical, acousti-cal or other forms of propagated signals, such as carrier waves, infrared signals, digital signals, etc. However, propa-gated signals, such as carrier waves, infrared signals, digital signals, etc. are not tangible machine readable medium and are not configured to store instructions.

In general, a machine readable medium includes any mechanism that provides (i.e., stores and/or transmits) infor-mation in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A vehicle, comprising:
vehicle controls;
sensors;
a memory configured to store a first artificial neural network model; and
at least one processor coupled to the memory and configured to:
  receive inputs from the sensors;
  operate the vehicle controls using outputs from the first artificial neural network model;
  select a first portion of the inputs, without selecting a second portion of the inputs, based on the outputs from the first artificial neural network model during operating of the vehicle controls using the sensors;
  train the first artificial neural network model using the first portion of the inputs, without using the second portion of the inputs; and
  operate the vehicle controls using the first artificial neural network model trained using the first portion of the inputs.

2. The vehicle of claim 1, wherein the at least one processor is further configured to train the first artificial neural network model using unsupervised machine learning from the first portion of the inputs.

3. The vehicle of claim 2, wherein the at least one processor is further configured to transmit the first portion of the inputs to a centralized computer server without transmitting the second portion of the inputs; and the centralized computer server is configured to generate a second artificial neural network model using at least the at least the first portion of the inputs.

4. The vehicle of claim 3, wherein the at least one processor is further configured to:
  receive, from the centralized computer server, the second artificial neural network model; and
  replace the first artificial neural network model, trained in the vehicle using the first portion of the inputs, with the second artificial neural network model generated by the centralized computer server using at least the first portion of the inputs.

5. The vehicle of claim 4, wherein the at least one processor is further configured to:
  receive a further input generated by separate sensors not in the vehicle; and
  train the first artificial neural network model using the further input.

6. The vehicle of claim 5, wherein the further input is received via the centralized computer server from a separate vehicle having installed therein the separate sensors.

7. The vehicle of claim 4, wherein the at least processor is further configured to:
  transmit a result of the unsupervised machine learning to the centralized computer server;
  wherein the second artificial neural network model is generated using the result.

8. The vehicle of claim 2, wherein the outputs from the first artificial neural network model identify the first portion of the inputs as being in a category and the second portion of the inputs being not in the category; and the at least one processor is further configured to select the first portion of the inputs based on the first portion of the inputs being in the category.

9. The vehicle of claim 8, wherein the inputs include an image captured by the sensors including at least one of:
  a visible light camera;
  an infrared camera;
  a sonar;
  a radar; and
  a lidar.

10. The vehicle of claim 9, wherein the image captures an item; and the category is configured to represent the first artificial neural network having:
  insufficient knowledge about the item;
  insufficient capability to classify the item into a plurality of predefined categories;
  insufficient capability to identify the item;
  insufficient accuracy in identification of the item; or
  insufficient confidence in recognizing of the item.

11. The vehicle of claim 2, wherein the vehicle controls are operable to at least:
  accelerate of the vehicle;
  stop the vehicle; or
  steer the vehicle; or
  any combination thereof.

12. A method, comprising:
receiving inputs from sensors installed on a vehicle;
operating vehicle controls using outputs from a first artificial neural network model;
selecting, by the vehicle, a first portion of the inputs, without selecting a second portion of the inputs, based on the outputs from the first artificial neural network model during operating of the vehicle controls using the sensors;
training, in the vehicle, the first artificial neural network model using the first portion of the inputs, without using the second portion of the inputs; and
operating the vehicle controls using the first artificial neural network model trained using the first portion of the inputs.

13. The method of claim 12, wherein training of the first artificial neural network model uses unsupervised machine learning from the first portion of the inputs.

14. The method of claim 13, further comprising:
transmitting the first portion of the inputs to a centralized computer server without transmitting the second portion of the inputs;
generating, by the centralized computer server, a second artificial neural network model using at least the at least the first portion of the inputs;
receiving, by the vehicle from the centralized computer server, the second artificial neural network model; and
replacing, in the vehicle, the first artificial neural network model, trained in the vehicle using the first portion of the inputs, with the second artificial neural network model generated by the centralized computer server using at least the first portion of the inputs.

15. The method of claim 14, further comprising:

receiving, in the vehicle via the centralized computer, a further input generated by separate sensors installed in a separate vehicle; and training the first artificial neural network model using the further input.

16. The method of claim 14, further comprising:

transmitting, from the vehicle, a result of the unsupervised machine learning to the centralized computer server;

wherein the second artificial neural network model is generated using the result.

17. A non-transitory computer storage medium storing instructions which when executed by a computing device causes the computing device to perform a method, the method comprising:

receiving inputs from sensors installed on a vehicle;

operating vehicle controls using outputs from a first artificial neural network model;

selecting a first portion of the inputs, without selecting a second portion of the inputs, based on the outputs from the first artificial neural network model during operating of the vehicle controls using the sensors;

training, in the vehicle, the first artificial neural network model using the first portion of the inputs, without using the second portion of the inputs; and operating the vehicle controls using the first artificial neural network model trained using the first portion of the inputs.

18. The non-transitory computer storage medium of claim 17, wherein training of the first artificial neural network model uses unsupervised machine learning from the first portion of the inputs; and the method further comprises:

transmitting the first portion of the inputs to a centralized computer server without transmitting the second portion of the inputs;

generating, by the centralized computer server, a second artificial neural network model using at least the at least the first portion of the inputs;

receiving, by the vehicle from the centralized computer server, the second artificial neural network model; and replacing, in the vehicle, the first artificial neural network model, trained in the vehicle using the first portion of the inputs, with the second artificial neural network model generated by the centralized computer server using at least the first portion of the inputs.

19. The non-transitory computer storage medium of claim 18, wherein the method further comprises:

receiving, in the vehicle via the centralized computer, a further input generated by separate sensors installed in a separate vehicle; and training the first artificial neural network model using the further input.

20. The non-transitory computer storage medium of claim 18, wherein the method further comprises:

transmitting, from the vehicle, a result of the unsupervised machine learning to the centralized computer server;

wherein the second artificial neural network model is generated using the result.

*    *    *    *    *